UNITED STATES PATENT OFFICE.

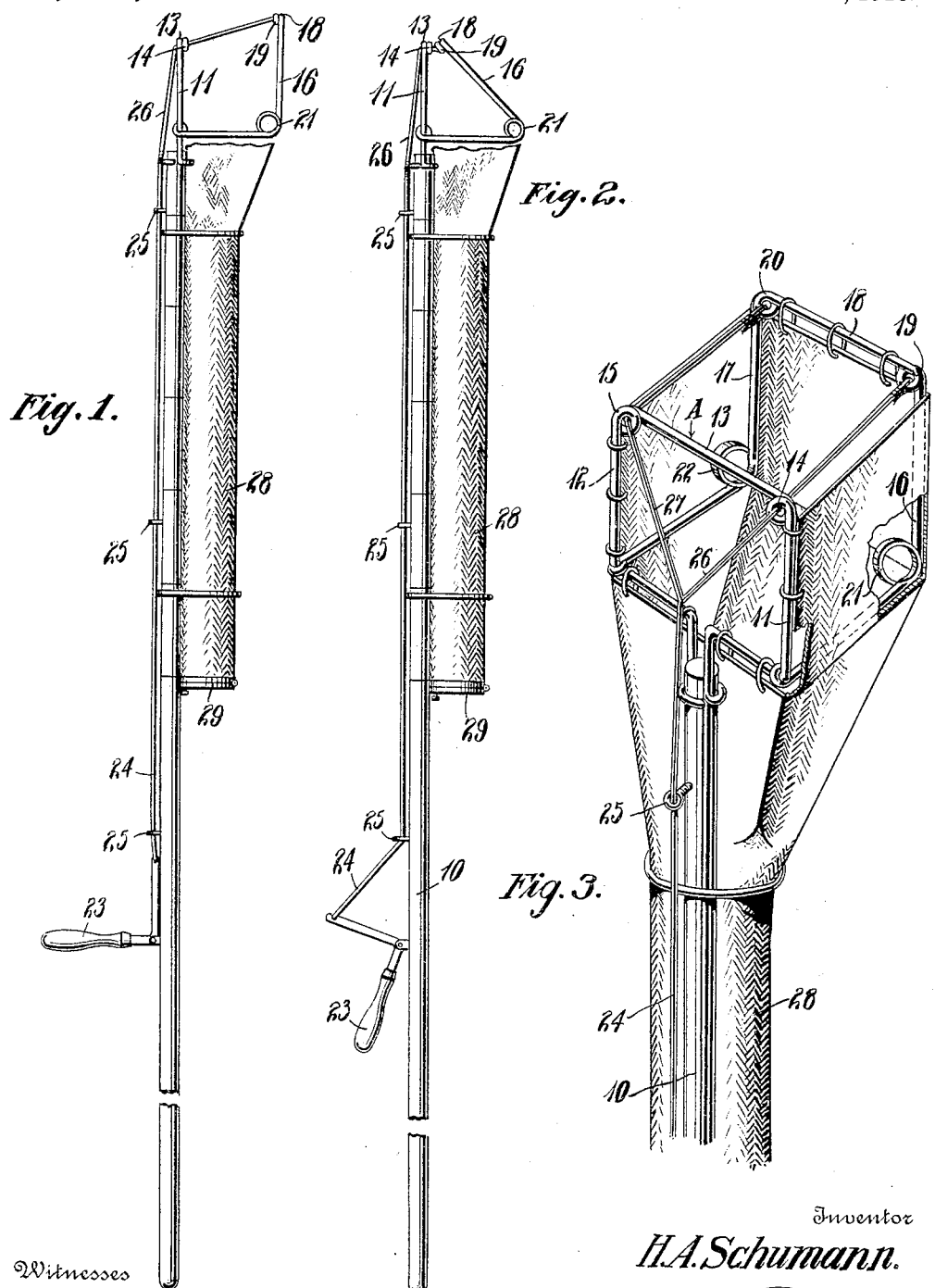

HERMAN A. SCHUMANN, OF BOONVILLE, MISSOURI.

FRUIT-PICKER.

1,056,221. Specification of Letters Patent. Patented Mar. 18, 1913.

Application filed October 30, 1911. Serial No. 657,654.

*To all whom it may concern:*

Be it known that I, HERMAN A. SCHUMANN, a citizen of the United States, residing at Boonville, in the county of Cooper, State of Missouri, have invented certain new and useful Improvements in Fruit-Pickers; and I do hereby declare the following to be a full, clear, and exact description of the invention, such as will enable others skilled in the art to which it appertains to make and use the same.

This invention relates to fruit pickers.

The object of the invention resides in the provision of a fruit picker which will dispense with the necessity of climbing the tree in order to gather the fruit, and which will also protect the fruit in the operation of gathering from bruising or injury.

With the above and other objects in view, the invention consists in the details of construction and in the arrangement and combination of parts to be hereinafter more fully described and particularly pointed out in the appended claim.

In describing the invention in detail, reference will be had to the accompanying drawings wherein like characters of reference denote corresponding parts in the several views, and in which—

Figure 1, is a side elevation of the invention partly broken away showing the stripping jaws in expanded or normal position, Fig. 2, a view similar to Fig. 1 showing the stripping jaws operated toward each other, and Fig. 3, a detail perspective view showing the manner of constructing the receiving end and stripping jaws of the device.

Referring to the drawings, the device is shown as comprising a sectional handle 10 to one end of which are secured the coöperating stripping jaws of the device. One of these jaws is formed from a single strand of wire having its intermediate portion bent to form a square frame A which comprises side members 11 and 12 and an outer end member 13, the wire from which the frame A is formed being looped at the junction of the side members 11 and 12 with the outer end member 13 as at 14 and 15. The free ends of the wire from which the frame A is formed are bent inwardly toward the handle in spaced relation to each other and are suitably anchored to said handle. The frame A thus formed and secured to the handle 10 constitutes one of the stripping jaws of the device. The other stripping jaw of the device is also formed from a single strand of wire bent to form side members 16 and 17 disposed in spaced relation to the side members 11 and 12 respectively and an end member 18 disposed in spaced relation to the end member 13. The wire from which the side members 16 and 17 and end member 18 are formed is looped at the junction of the end member 18 with the side members 16 and 17 as at 19 and 20. The terminals of the wire from which the side members 16 and 17 are formed are looped at the inner end of said side members as at 21 and 22 and then bent toward the frame A and fixed to the inner ends of the side members 11 and 12 respectively. From this construction it will be apparent that the side members 16 and 17 and the end members 18 constitute a stripping jaw for coöperation with the stripping jaw formed by the side members 11 and 12 and the end member 13.

Mounted upon the handle 10 is an operating angle lever 23 which is secured to one end of a flexible connection 24 traveling in guides 25 mounted upon the handle 10. The outer end of the connection 24 terminates in independent sections 26 and 27 which are directed respectively through the eyes 14 and 15. The free end of the section 26 is secured to the loop 19 while the free end of the section 27 is secured to the loop 20. By this construction it will be apparent that when the lever 23 is operated so as to draw the connection 24 toward the inner end of the handle the end members 13 and 18 will be moved toward each other against the resiliency of the wire from which they are formed and this movement of said end members is resorted to in order to effect the stripping of the fruit from the tree, it being of course understood that the device is positioned so as to dispose the fruit between the end members 13 and 18 before the latter are operated toward each other. After the stripping of the fruit is thus effected the lever 23 is released and said end members 13 and 18 will move away from each other under the influence of the resiliency of the wire from which they are formed.

Secured against the handle 10 and extending longitudinally thereof is a fabric bag or receptacle 28 the outer end of which is enlarged and secured in a suitable manner to the side members 16 and 17 and to the portions connecting said side members 16 and 17 to the side members 11 and 12. By this construction it will be apparent that fruit stripped by the end members 13 and 18 will fall into the receptacle 28 and be substantially immune from injury. The inner or lower end of the receptacle 28 is provided with a detachable closure 29 through the instrumentality of which the fruit contained within the receptacle may be removed therefrom.

What is claimed is:

A fruit picker comprising a handle, coöperating stripping jaws mounted on one end of said handle, one of said stripping jaws being formed from a single strand of resilient wire and including an outer member, side members and an inner member, the outer member being provided with loops at its junction with the side members and the inner member comprising separate sections having inwardly directed terminals engaged with the handle, the other stripping jaw being also formed of a single strand of resilient wire and comprising a second frame including an outer member and parallel side members, the outer member being provided with loops at its ends and extending parallel with the outer member of the first named jaw and having its side members provided with loops respectively at an intermediate point and directed toward and engaged with the first named jaw to form a portion that is normally at right angles to the main portion of the second named frame, an angle lever mounted on the handle, a flexible connection secured to the free end of one arm of said angle lever and terminating at its other end in a divided portion the members of which extend through the loops at the ends of the outer member of the first named jaw respectively and are secured to the loops at the ends of the outer member of the second named jaw, whereby the rocking of said lever will draw the outer ends of said jaws toward each other, and a receptacle extending contiguous to the handle and having its mouth end secured to said first and second named jaws.

In testimony whereof, I affix my signature, in presence of two witnesses.

HERMAN A. SCHUMANN

Witnesses:
 W. C. LAUER,
 E. J. MUNTZEL.

Copies of this patent may be obtained for five cents each, by addressing the "Commissioner of Patents, Washington, D. C."